Aug. 24, 1965     D. KANE     3,202,361

MOBILE IRRIGATION DEVICE

Filed Sept. 12, 1963     3 Sheets-Sheet 1

INVENTOR.
David Kane
BY
ATTORNEYS

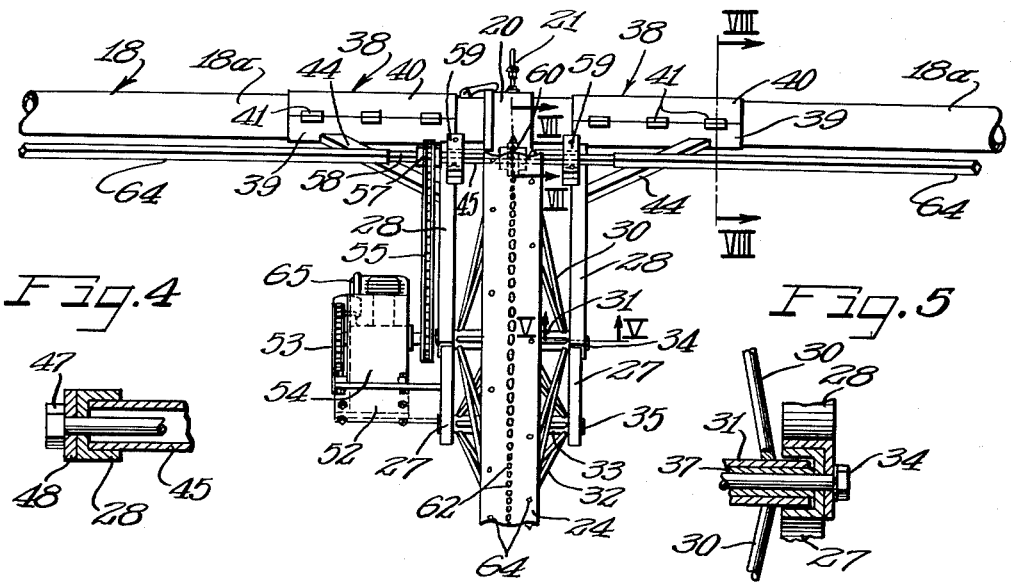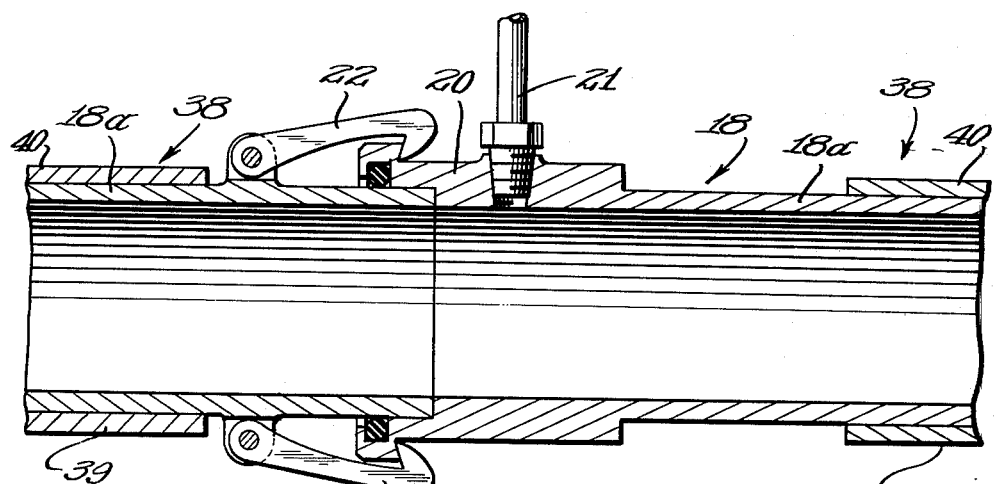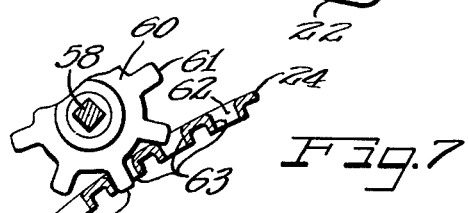

Aug. 24, 1965  D. KANE  3,202,361
MOBILE IRRIGATION DEVICE
Filed Sept. 12, 1963  3 Sheets-Sheet 3

INVENTOR.
David Kane
BY
ATTORNEYS

United States Patent Office 3,202,361
Patented Aug. 24, 1965

3,202,361
MOBILE IRRIGATION DEVICE
David Kane, 108 Tuttle Road, San Antonio, Tex.
Filed Sept. 12, 1963, Ser. No. 308,440
3 Claims. (Cl. 239—212)

The present invention relates to improvements in irrigation devices and more particularly concerns a new and improved arrangement for facilitating movement of sprinkler conduits or pipes in field irrigation.

Irrigation of various field crops is effected on a substantial scale by means of sprinkler conduits leading from a supply duct or header pipe, with sprinkler heads located at suitable intervals along the conduits, such as at twenty or thirty feet intervals, requiring manual movement and relocation of the conduits to cover progressive areas of a field to be irrigated. This has heretofore entailed a great deal of labor in disconnecting irrigation pipe sections and reconnecting the pipes at the progressively advanced locations. Because of the slow, tedious nature of the prior arrangement, large scale operations have required substantial staffs of laborers for the purpose. Further, in view of the numerous handlings of the pipe sections, damage to the couplings and sprinkler heads has been an important cost factor.

An important object of the present invention is to provide a new and improved irrigation device whereby sprinkler irrigation conduits in even long lengths are easily moved over a field to be irrigated progressively or continuously.

Another object of the invention is to provide a new and improved mobile irrigation device to facilitate moving irrigation conduit over a field to be irrigated.

A further object of the invention is to provide a novel self-powered mobile irrigation device.

Still another object of the invention is to provide a new and improved mobile irrigation device which is constructed and arranged for compact knock-down shipment and storage and which is easily erected and adjustable with the simplest of tools and in a simple and uncomplicated manner.

Other objects, features and advantages of the present invention will be readily apparent from the following detailed description of certain preferred embodiments thereof taken in conjunction with the accompanying drawings, in which:

FIGURE 3 is a front elevational view of that portion of the installation, comprising the powered mobilizing unit depicted in FIGURE 2;

FIGURE 4 is a fragmentary enlarged sectional detail view taken substantially on the line IV—IV of FIGURE 2;

FIGURE 5 is a fragmentary enlarged sectional detail view taken substantially on the line V—V of FIGURE 3;

FIGURE 6 is an enlarged fragmentary sectional detail view taken substantially on the line VI—VI of FIGURE 2;

FIGURE 7 is an enlarged fragmentary sectional elevational detail view taken substantially on the line VII—VII of FIGURE 3;

Figure 1:
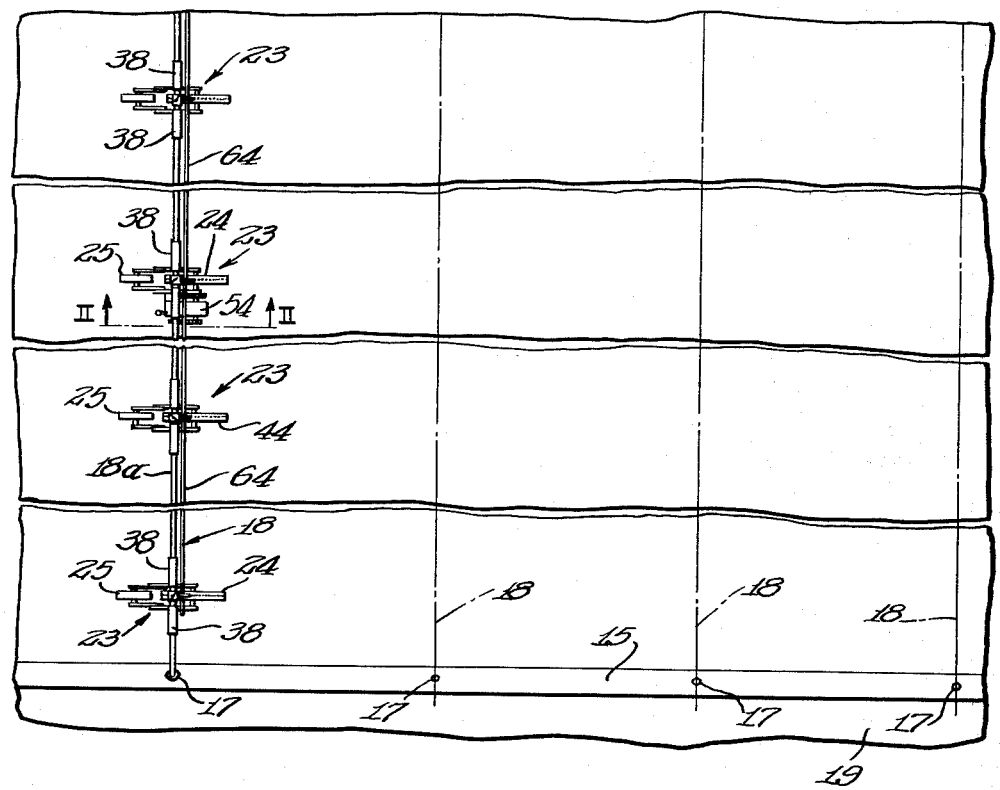
FIGURE 1 is a fragmental, generally schematic view of a field irrigating installation embodying features of the invention.

As shown in FIGURE 1, an irrigation water duct 15 leading from a suitable source under a desirable head of pressure has suitable taps 17 longitudinally therealong at desired intervals such as from twenty to forty feet for detachable connection in water supply communication with the duct 15 of one or more irrigation conduits 18 to extend angularly from the supply duct or header across at least a substantial portion of a field 19 to be irrigated.

In a typical arrangement, the irrigation conduit 18 comprises a longitudinal assembly of rigid or semi-rigid light weight (aluminum, for example), pipe sections 18a (FIGS. 1 and 6) of suitable length such as twenty to thirty feet or longer, each of which is provided at one end with a female coupling section 20 carrying a sprinkler head 21 and arranged to receive the opposite, male end of one of the pipe sections 18a to be joined therewith and carrying one or more clamps or latches 22 by which the sections are held in separable, coaxial water conducting alignment. Heretofore, it has been necessary in order to shift the conduit 18 to dismantle the sections, transport them to the next area to be irrigated and reconnect the pipe sections and connect the appropriate coupling end to one of the taps 17.

Figure 2:
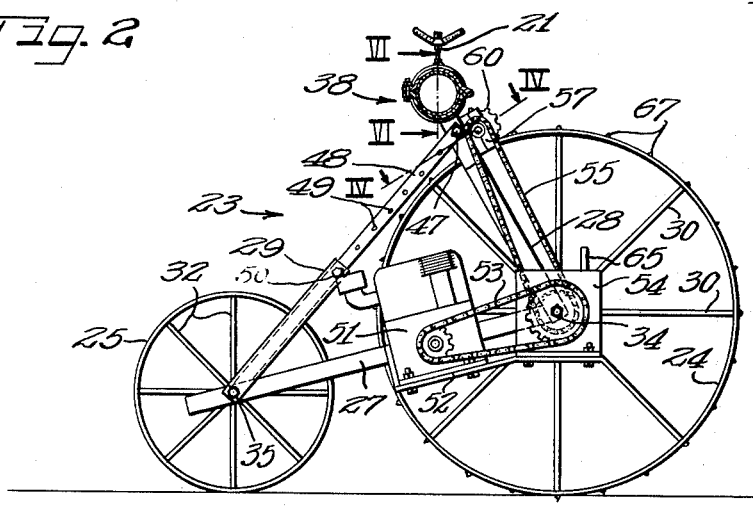
FIGURE 2 is an enlarged fragmentary sectional elevational view taken substantially on the line II—II of FIGURE 1.

According to the present invention, novel means are provided to enable moving the entire conduit assembly 18 as a mobile unit, without disconnecting any of the pipe sections 18a from one another, from one area to be irrigated to the next area to be irrigated. To this end, the irrigating conduit is provided with a suitable number of wheel means assemblies 23 (FIG. 1) preferably associated with the coupling portions of the pipe sections 18a in a manner to stabilize the conduit assembly throughout its length and enable it to be transported on its wheels as a substantially rectilinear unit. Each of the wheel units 23, in the exemplary form shown, comprises a pair of wheels 24 and 25 supporting a pipe-carrying framework of generally triangular form including at each side of the wheels a lower generally front-to-rear connecting or base bar 27 and generally upwardly extending converging brace bars 28 and 29. Each of the wheels 24 and 25 comprises a metallic tread hoop of substantial width (FIGS. 2 and 3) which is preferably annularly corrugated for rigidity although of minimum gauge material suitable for the purpose. Spokes 30 connect the tread hoop of the wheel 24 with a tubular hub 31 of somewhat greater length than the width of the wheel tread, while spokes 32 connect the tread hoop of the wheel 25 with a similar length tubular hub 33.

Construction of the mobile carriage or frame of each of the wheel units 23 is such that each of the wheel units can be shipped and supplied as a knock-down unit which can be readily assembled by the user with the aid of only the simplest tools, and primarily one or more simple wrenches. For this purpose, simple bar stock is used, desirably channel bar or strip stock for light weight with maximum rigidity, with the bars disposed in the assembly with their longitudinal flanges directed inwardly. Each of the base bars 27 is suitably drilled or punched through its opposite end portions to receive therethrough respective axle bolts 34 and 35 of the wheels 24 and 25 extending through the respective tubular wheel hubs. To facilitate attachment of the converging frame bars 28 and 29, they have lower end portions of the longitudinal angular flanges appropriately cut-away so that the web portions of such bars can be lappingly engaged against the outer face of the associated base bar 27, with the axle bolts 24 and 25 extending through suitable axle holes. As representative of this relationship, reference is directed to FIGURE 5 which, although it shows details of the axle and frame bar connection for the wheel 24, is equally representative of the similar structure for the wheel 25. In order to enable rigid tightening of the axle bolts while yet retaining the hubs 31 freely rotatable, a bearing tube 37 is freely rotatably engaged within the hub of the wheel and is slightly longer than the hub so that the frame bars 27 and 28 can be rigidly secured by tightening the axle bolt 34, while the frame bars 27 and 29 can be similarly rigidly fastened by tightening the axle bolt 35, and the wheels 24 and 25 will rotate freely relative to the rigidly tightened frame.

Figure 8:
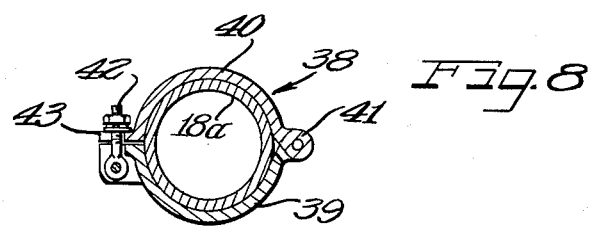
FIGURE 8 is a fragmentary enlarged sectional detail view taken substantially on the line VIII—VIII of FIGURE 3.

On the upper end of the carrying frame of each of the wheel units 23 is provided means for attaching the wheel unit to the conduit 18. For this purpose, each of the frame bars 28 carries rigidly on its upper end a pipe-engaging clamp assembly 38 (FIGS. 1, 2 and 3) of elongated tubular form. In an efficient construction, each of the clamp assemblies comprises opposed separable clamp shells 39 and 40 (FIG. 8) of substantially semi-cylindrical form connected together in complementary clamping relation by suitable hinges 41 along one of their joining edges and having suitable latching means along their opposite opposing edges, such as latch bolts 42 having eyes at one end pivotally connected to one of the clamp shells such as the lower shell 39 and engageable releasably with latching ears 43 rigid with the complementary upper clamp shell 40. Each of the lower clamp shells 39 is rigidly secured adjacent to one end as by welding to the upper end of its associated frame bar 28, and a rigid brace bar 44 extends diagonally upwardly from the frame bar 28 to adjacent the opposite end of the clamp shell 39 and is secured to the bar and the clamp shell as by means of welding. Through this arrangement, each of the clamps 38 projects in the opposite direction in spaced coaxial relation to accommodate the coupling structure of the associated conduit pipe joint between the spaced adjacent inner ends of the clamps (FIGS. 3 and 6). In a typical example, this spaced relationship may be on the order of ten or eleven inches, and with the length of each of the clamps about eighteen inches. This results in a quite stable connection of the wheel unit 23 to the conduit assembly.

In order to maintain the upper end portions of the frame bars 28 in rigid spaced relation, as well as to attach the converging frame bars 29 rigidly thereto, rigid tubular spacer bar 45 is secured to and between the upper end portions of the frame bars 28 by means of a removable bolt 47. This positively maintains the frame bars 28 against any tendency to sag or distort under the load imposed on the supporting clamps 38 by the weight of the conduit 18. Further, the clamps 38 are thereby thoroughly stabilized to afford substantial reinforcement for the associated pipe joint against bending and tension stresses.

Since for crops of varying types, or at various times during the growing season it may be desirable to have the irrigating conduit 18 at different heights, provisions are preferably made for enabling adjustment of the height at which the clamps 38 support the conduit within suitable limits. For this purpose, the frame bar 29 is constructed for longitudinal adjustment as to length and therefore comprises an upper extension bar 48 telescopically joined to the relatively short lower portion of the bar 29 and projecting upwardly therefrom and secured at its upper end portion by the bolt 47 to the associated frame bar 28. For vertical adjustments, suitable aligned graduated bolt holes 49 in the bar 29 and the extension 48 enable telescoped attachment of the bars in any preferred adjusted relationship by means of a releasable securing bolt 50. To effect vertical adjustment, the bolts 34, 35, 47 and 50 are loosened, the bolt 50 removed in each instance and adjustment effected, whereupon all of the bolts are re-tightened and the entire frame including both sets of generally triangularly related frame bars resumes its rigid supporting relationship.

Mobility of the wheeled conduit assembly is greatly enhanced by equipping the same with propelling means. Since only limited power is needed for this purpose, a relatively low horsepower prime mover is adapted to be utilized for moving the entire wheeled conduit as a unit. To this end, one of the wheel assemblies 23, preferably the one nearest the longitudinal center of the conduit assembly 18, carries a suitable lightweight motor 51 (FIGS. 1, 2 and 3) conveniently mounted on a platform or bracket 52 carried by one of the frame base bars 27. Such motor may be either a gasoline motor or an electrical motor, as preferred, and has its drive shaft coupled by an endless flexible driving connector 53 with a gear reduction unit 54 having its output shaft coaxial with the shaft of the wheel 24 and coupled by means of a flexible endless driving connector 55 with a transmission wheel 57 suitably keyed to a drive shaft 58 rotatably supported on a horizontal axis parallel to the clamps 38 on bearings in pillow blocks 59 suitably mounted on the frame bars 28. By this drive shaft 58, the wheel 24 is adapted to be driven through a small diameter driving wheel 60 suitably keyed to the shaft and having radially extending driving lugs 61 engageable with the tread hoop of the wheel 24 through suitably peripherally elongated socket apertures 62 punched centrally of the width of the tread hoop and defined at least at the ends thereof which receive driving thrust from the lugs 61 by inwardly directed thrust cam flanges 63 derived from material punched inwardly in the formation of the holes 62. Increased driving torque from low horsepower driving source is attained by the large gear reduction ratio attained by not only the gear reduction unit 54 in the transmission but also small diameter of the driving wheel 60 (FIG. 6) to diameter of the driven wheel 24. Thus, while the driving wheel 60 may be only a few inches in diameter, the driven wheel 24 may be on the order of four feet in diameter. For the present purpose a slow rate of automation is preferred.

In order to relieve the wheeled conduit assembly of driving strain, power from the power-carrying wheel assembly 23 is transmitted to each of the parallel wheel assemblies 23 in each direction from the power-carrying wheel assembly longitudinally along the conduit unit. Accordingly, the drive shaft 58 is duplicated on each of the wheel assemblies 23, with each of the drive shafts carrying coupled thereto one of the driving wheels 60. At least the opposite end portions of each of the drive shafts 58 is extended a preferred limited distance beyond each of the pillow blocks 59 and is engaged by a respective end portion of a coupling rod or bar 64 (FIGS. 1 and 3). In a convenient and efficient arrangement, the coupling end portions of the drive shafts 58 are square and the coupling bars are formed from square tubing of an inside dimension at least on its end portions to engage in keying relation over the respective connected end portions of the drive shafts 58. The length of each of the coupling shaft bars 64 is greater than the spacing between the ends of adjacent aligned drive shafts but short of the adjacent pillow blocks 59 so that while the connecting shaft bars 64 are self-adjustable longitudinally, they will remain in efficient coupled relation to the engaged end portions of the drive shafts 58. Through this arrangement, when it is desired to move the conduit unit 18 from one of the taps 17 to the next tap, the conduit unit 18 disconnected from the first tap, the motor 51 is energized, and the entire conduit unit 18 moves forwardly to its new location under its own power. Having arrived at the new location, the motor is stopped, the conduit is connected to the selected tap 17 and thus in communication with the supply duct 15 for resumption of irrigating distribution of water from the several sprinkler heads 21. By providing the gear reduction unit 54 with suitable reversible clutch means operated through a lever 65 or the like, reversal of the direction of automotive propulsion of the conduit unit 18 is readily effected.

In order to improve traction of the driven wheels 24 of the wheel assemblies 23 of the device, suitable traction lug means 67 (FIGS. 2, 3 and 7) are provided on the ground-engaging perimeter of the wheels.

The present mobile irrigation device lends itself well to trough pick-up of irrigation water while in continuous regulated slow travel over a field to be irrigated continuously and progressively throughout the length of the trough. For this purpose, one of the wheel assemblies 23 (FIGS. 9 and 10) is modified to the extent of eliminating the traction lugs from the perimeter of the traction wheel 24 to adapt the same to run smoothly in an irrigation water trough 68, and also to carry a water pumping assembly 69 for supplying the conduit 18 with irrigation water under desirable pressure head to activate the sprinklers 21. At its opposite ends, the conduit is plugged. A convenient arrangement of the pumping assembly 69 comprises a prime mover 70 such as a gasoline engine or electric motor having a suitable drive connection such as by means of an endless flexible driving element 71 with a pump 72, desirably of the centrifugal type. Support for the motor and pump is provided by means such as a platform 73 mounted on the frame bars 29 over the smaller diameter running wheel 25. A water suction pick-up pipe 74 connects with the suction side of the pump 72. Communication with the conduit 18 is effected in suitable fashion as by means of a flexible conduit pipe 75 suitably coupled at one end to an outlet or discharge nozzle 77 of the pump 72 and at its opposite end to an inlet nipple 78 opening into the coupling end portion of one of the irrigation conduit pipe sections 18a. This flexible hose connection enables ready height adjustment of the conduit supporting head structure comprising the clamps 38 relative to the pumping assembly 69. Such adjustability is convenient for adjusting the conduit carrying head structure of the pumping wheeled unit for proper alignment with the conduit supporting head structures of the companion wheeled unit assemblies to compensate for possible variations in elevation of the bottom of the trough 68 relative to ground level, either higher, or lower, as may be required.

Figure 9:
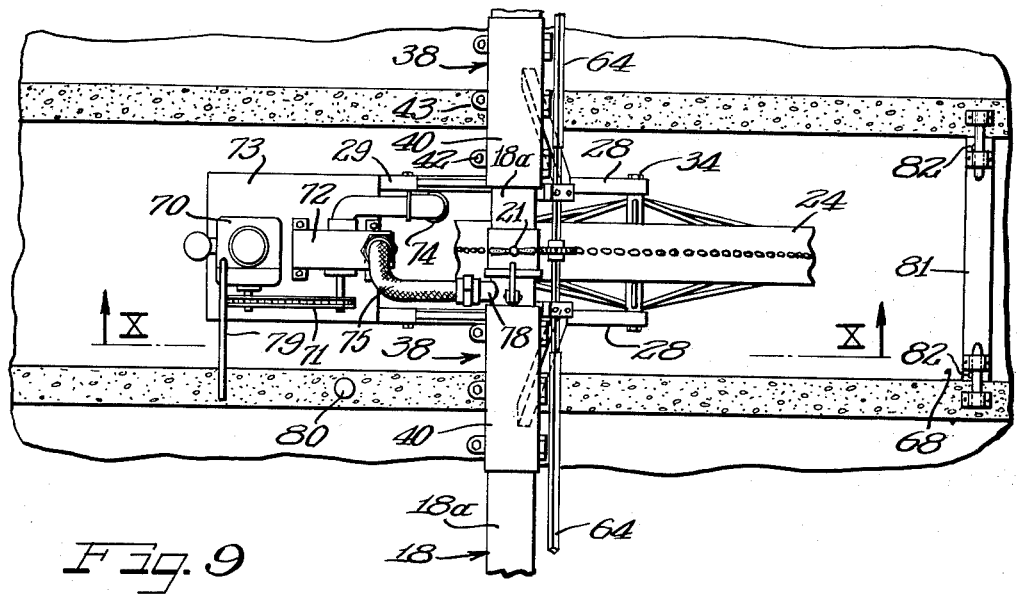
FIGURE 9 is a fragmentary plan view of a modification.
Figure 10:
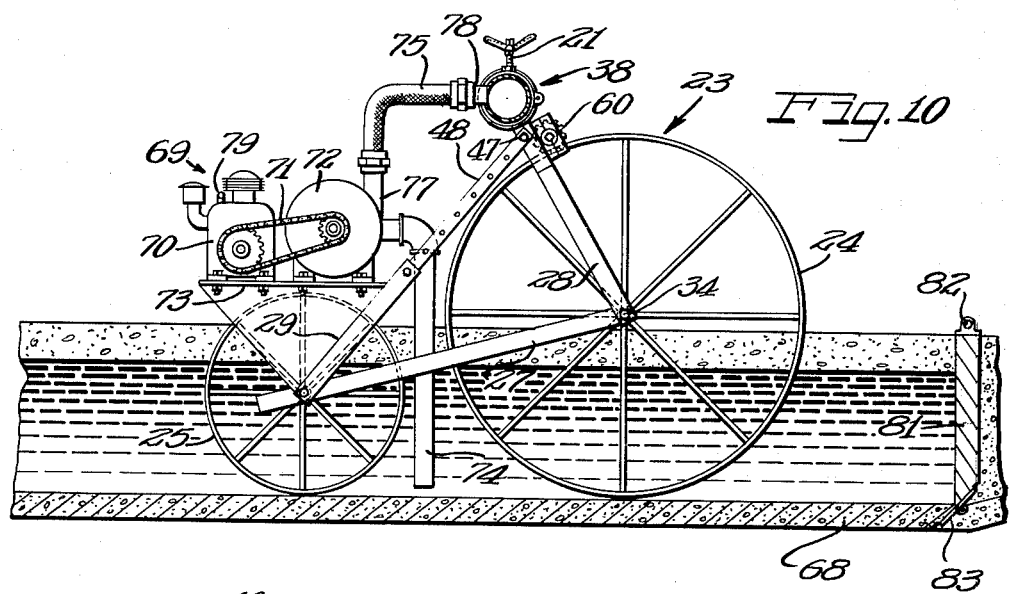
FIGURE 10 is a sectional elevational view taken substantially on the line X—X of FIGURE 9.

In addition to being self-propelled, and where equipped with the self-pumping feature of FIGURES 9 and 10, automation may be further implemented by the provision of means for automatically reversing the mobile irrigation conduit assembly or stopping it. This permits unattended operation of the device once it is started and is a great convenience for night irrigation operations, and for freeing attendant personnel for operating and servicing a large number of the devices in large scale farming operations, or for the performance of other tasks in smaller scale operations. For example, where the self-propelled, continuously travelling, trough supplied operation of the device is utilized, single pass running may be readily controlled by automatic shut-off means located adjacent to the opposite end of the trough 68 from that where the mobile unit is started. Such automatic shut-off means may take any desirable form, such, for example, as a control lever 79 (FIGS. 9 and 10) on the pump actuating motor 70 extending, as for example laterally, into the path of a trip arm 80 suitably mounted, as on the side of the trough 68. A similar arrangement may be supplied to control the drive motor 51, that is shut it off at the end of the desired run. Where it is preferred to run the mobile irrigation device continuously in opposite directions, such a trip device is adapted to be located for shifting the clutch lever 65 of the gear reduction device 54. Such clutch lever shifting means are adapted to be associated in the apparatus organization with automatic shut-off means so that after a predetermined number of self-propelled passes of the irrigation device over the selected area, the mobile unit will be brought to a halt.

To facilitate ready entry of the pumping wheeled assembly into substantially guided running relation on, and in this instance within, the water supply trough, and for running the assembly from the trough 68, as for transportation to an adjoining field having its own water supply trough system, or to clear the entire device from the area of the field adjacent to the trough to permit other agricultural machinery to operate, and the like, one or both ends of the trough 68 may be equipped with suitable means, such as a tailgate 81. This tailgate is normally in closing, water retaining relation to the end portion of the trough, as held by releasable latch means 82 but is adapted to be swung into an open, ramp position on hinges 83 along its bottom edge. Of course, if preferred, the gate 81 may be simply a gate valve slide arrangement of the type known in connection with water troughs, flumes and the like, so that it can be removed to open the end of the trough 68 when desired. A water gate may be provided adequately spaced from the opening end of the trough to hold back water in the trough where it is not practical to drain or deplete the water supply when it is desired to open the end of the trough for entry thereinto or exiting therefrom of the pumping wheeled assembly 23.

While the mobile irrigation conduit assembly is constructed to maintain all of the functioning elements thereof in proper operating relationship substantially rectilinearly along the length of the conduit 18, there is sufficient resilient yieldability in the components which must conform to slight irregularities of terrain in the propelled operation of the device, and more especially in the conduit carrying head structure and framework of the wheel assemblies 23. This enables the conduit unit to be of quite substantial practical length for irrigating fields of large size, although from the inherent advantages of the mobility, self-propulsion, etc., of the device it may be utilized efficiently in smaller sized units where desired.

It will be understood that modifications and variations may be effected without departing from the scope of the novel concepts of the present invention.

I claim as my invention:

1. A mobile irrigation device comprising an elongated irrigating conduit having a plurality of water distribution means at spaced intervals therealong,
   and a plurality of wheel assemblies supporting said conduit at spaced longitudinal intervals, said wheel assemblies comprising:
   a pair of wheels,
   a substantially triangular frame comprising upwardly convergently related frame members one of which has a portion extending upwardly beyond the other and one of which is longitudinally adjustable for raising and lowering said upwardly extending portion selectively,
   and a head structure on said upwardly extending portion supporting the conduit.

2. An irrigation device comprising a pair of supporting wheels disposed in a common plane on spaced parallel axes,
   two sets of generally triangularly arranged frame bars comprising a base bar and two upwardly converging bars extending from the opposite end portions of the base bar in each set,
   said sets of frame bars being disposed at respectively opposite sides of the wheels,
   means providing axles for the wheels,
   means securing the upper end portions of the converging bars together and thereby completing a frame for the device,
   means on the upper end portion of the converging frame bars in each set for supporting an irrigation conduit and comprising:
   an elongated tubular clamping structure having one end portion attached to one of the frame bars in each set and extending sidewardly to a substantial distance from the frame bars,
   and a bracing bar extending outwardly and upwardly from said one of the frame bars and supportingly engaging the outer end portion of the clamping structure,
   and means carried by the frame for driving one of said wheels to propel the device.

3. An irrigation device comprising:
spaced apart front and rear wheels having the axes parallel,
a frame supported by said wheels and including frame means extending upwardly substantially above said axes of the wheels,
means on the upper portion of said frame means for supporting an irrigation conduit and comprising:
   a pair of elongated tubular clamping structures coaxially aligned and having their adjacent ends substantially spaced apart and secured to said frame means,
   and a respective bracing bar extending upwardly and outwardly from said frame means and supportingly engaging the outer end portion of each of the clamping structures whereby said clamping structures are supported in substantially laterally projecting but stable relation on and by said frame means and separate conduit sections are adapted to be respectively supported by said clamping structures, coupling means for the conduit sections and sprinkler head means located between the spaced ends of the clamping structures,
and means carried by said frame for driving one of said wheels to propel the device.

References Cited by the Examiner

UNITED STATES PATENTS

| | | | |
|---|---|---|---|
| 738,271 | 9/03 | Astle | 239/286 |
| 762,081 | 6/04 | McNulty | 301—1 |
| 1,196,168 | 8/16 | Stearns | 74—460 |
| 1,530,211 | 3/25 | Siemnash | 16—45 |
| 1,966,783 | 7/34 | Balaam | 239—212 |
| 2,515,047 | 7/50 | Latieule et al. | 239—181 |
| 2,582,416 | 1/52 | Cornelius | 239—212 |
| 2,604,359 | 7/52 | Zybach | 239—177 |
| 2,628,863 | 2/53 | Maggart | 239—212 |
| 2,726,895 | 12/55 | Behlen | 239—212 |
| 2,741,510 | 4/56 | McCulloch | 239—213 |
| 2,744,785 | 5/56 | Lundegreen | 239—212 |
| 2,756,098 | 7/56 | Rottcher | 239—179 |
| 2,800,364 | 7/57 | Dick et al. | 239—212 |
| 2,801,132 | 7/57 | Shuck | 239—212 |
| 2,918,800 | 12/59 | Ford | 239—179 |
| 2,931,579 | 4/60 | Ruddell | 239—179 |
| 2,941,727 | 6/60 | Zybach | 239—212 |
| 2,991,626 | 7/61 | Browning | 61—29 |
| 3,009,645 | 11/61 | Nugent | 239—179 |

FOREIGN PATENTS

| | | |
|---|---|---|
| 356,073 | 7/22 | Germany. |
| 398,003 | 7/24 | Germany. |

EVERETT W. KIRBY, *Primary Examiner.*